Patented July 9, 1935

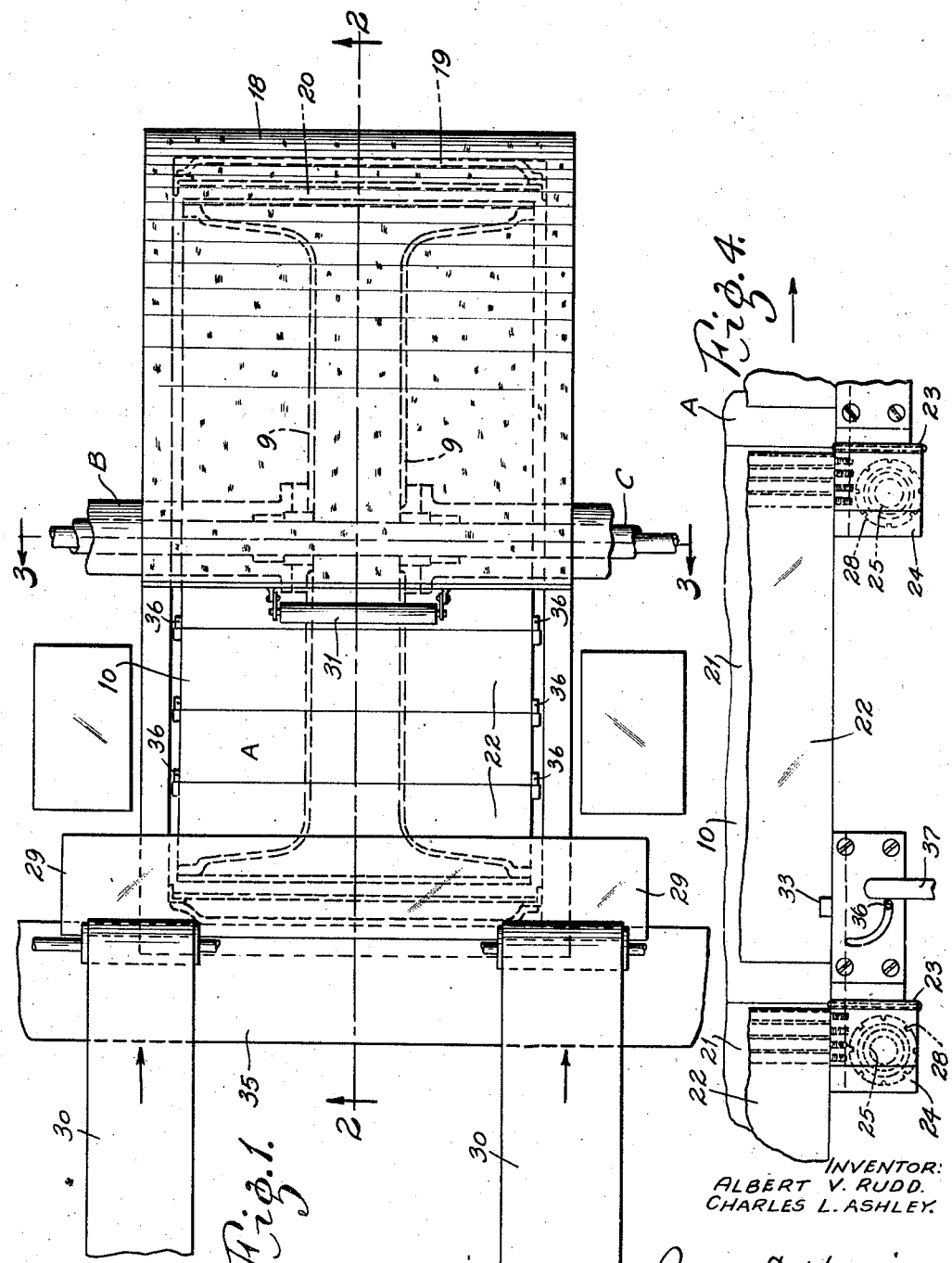

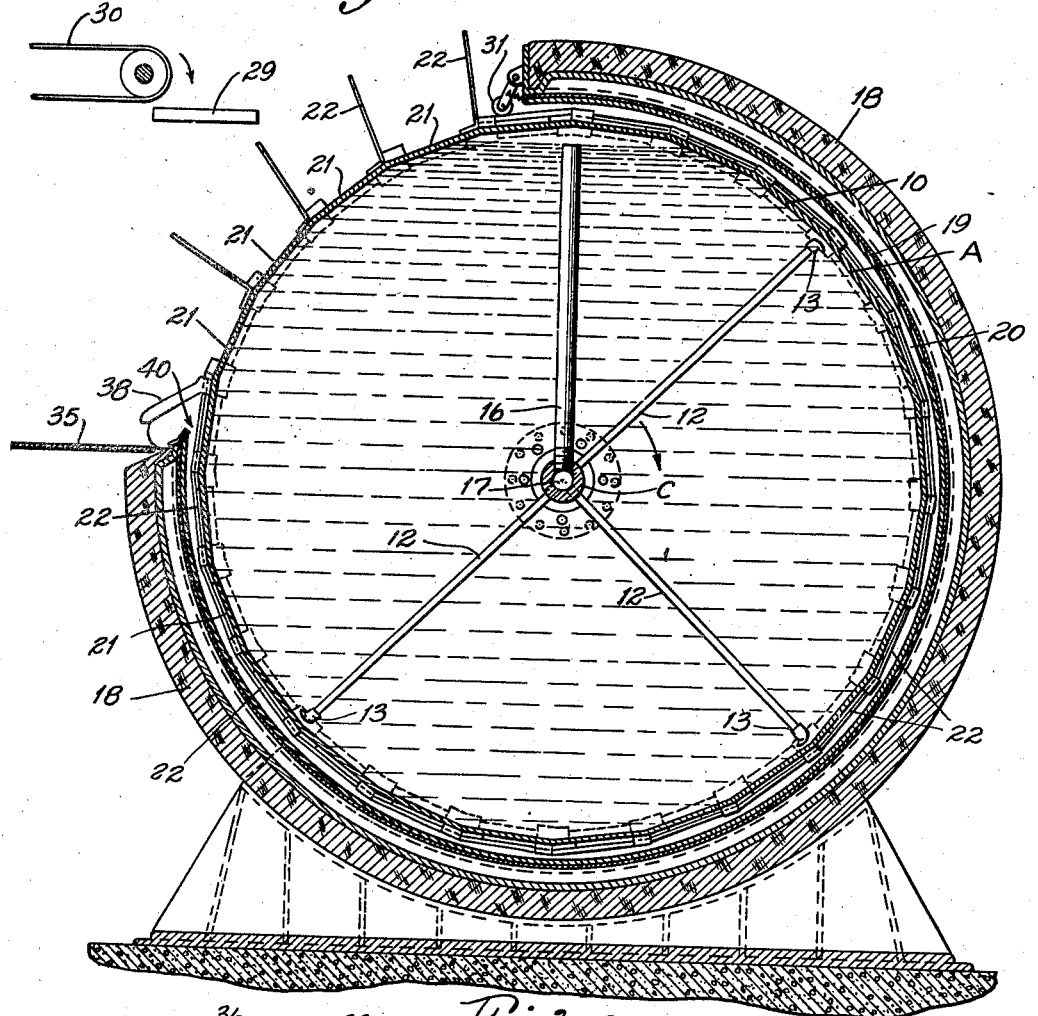
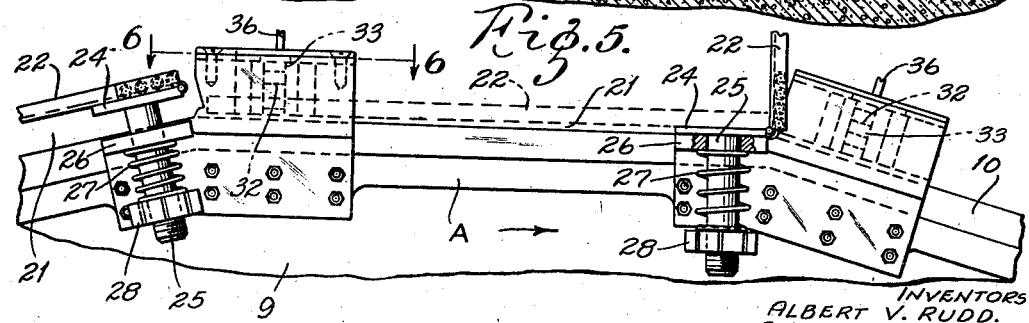

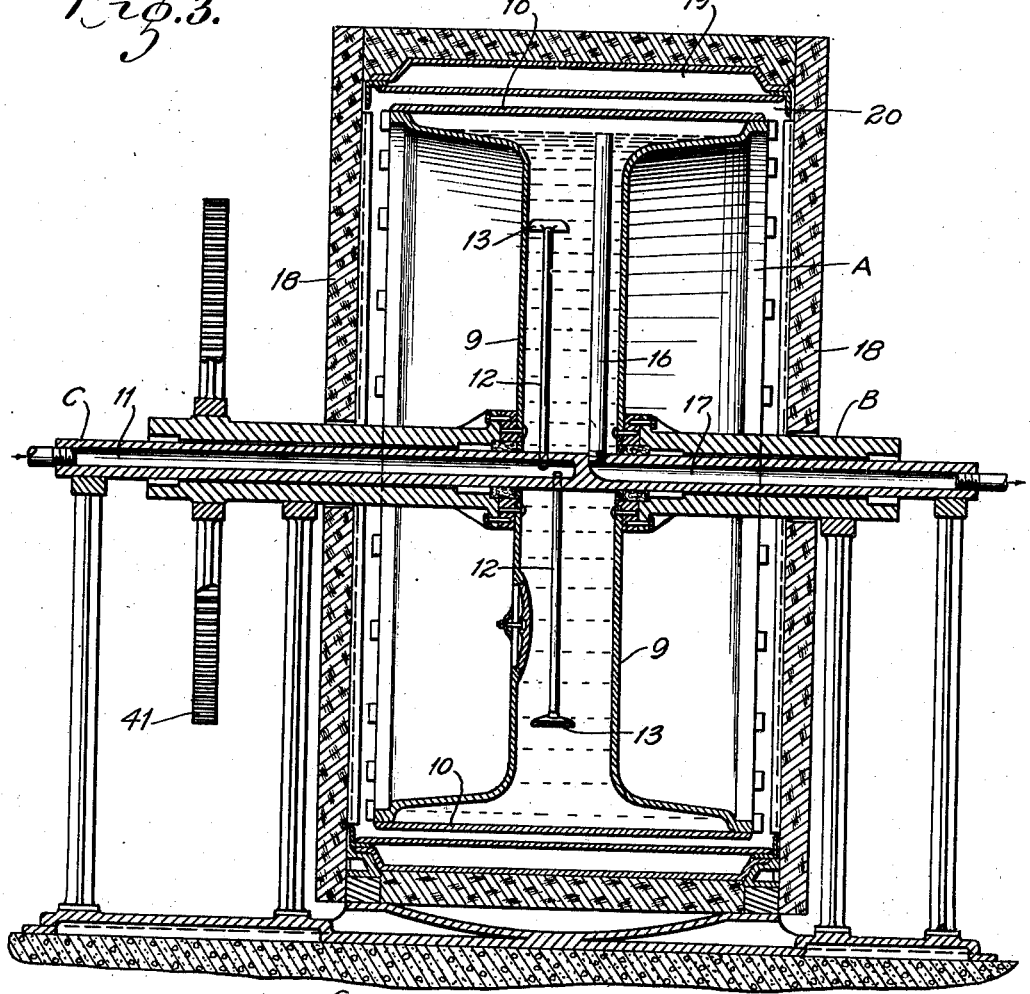
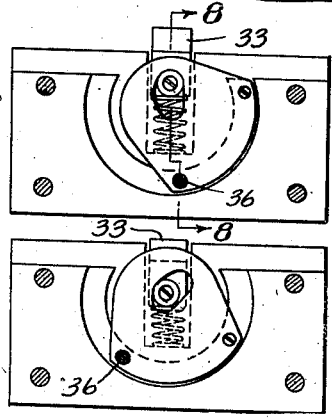
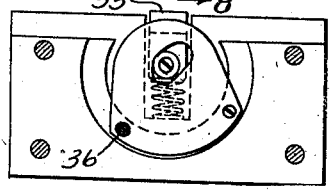
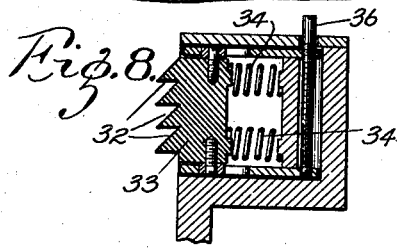
INVENTORS
ALBERT V. RUDD
CHARLES L. ASHLEY.
ATTORNEY.

2,007,837

UNITED STATES PATENT OFFICE 2,007,837

REFRIGERATING APPARATUS

Albert V. Rudd, St. Louis, and Charles L. Ashley, Webster Groves, Mo., assignors to Rudd Engineering Company, St. Louis, Mo., a corporation of Missouri Application April 18, 1930, Serial No. 445,368

20 Claims. (Cl. 62—114)

Our invention relates to improvements in refrigerating apparatus, and more particularly relates to the refrigeration of fish, meat and other foodstuffs. Among the objects of our invention are to provide a series of compartments or units each of a size adapted to hold a unitary parcel of fish or meat products and refrigerate such parcel in convenient size and shape for being distributed and sold at retail to the ultimate consumer. Such preparation of the specified food products is intended to render the product readily handled by the dealer and to avoid the necessity of tying, boxing or other extraneous means for maintaining the shape of the refrigerated food product; to reduce fillets of fish, and cuts of meat (such as steaks, chops, etc.) into substantial refrigerated blocks which may be conveniently protected from the atmosphere, dust, dirt, or other contamination, by means of wrappings of suitable material. Other advantages and results of our invention will be made evident by the appended description.

Drawings

In the drawings—

Fig. 1 is a top plan view of a device embodying our invention.

Fig. 2 is a vertical mid-sectional view of the same, taken on the line 2—2 of Fig. 1.

Fig. 3 is a transverse mid-sectional view of the same, taken on the line 3—3 of Fig. 1.

Fig. 4 is an enlarged detail plan view of the locking and releasing mechanism for the lids or covers of the refrigerating compartments or units.

Fig. 5 is a side elevation of one of said refrigerating compartments in place upon the periphery of the refrigerating drum.

Fig. 6 is a plan view of the latching mechanism, which engages the compartment lids, the trip pin being in locking position, taken on line 6—6 of Fig. 5.

Fig. 7 is a view similar to Fig. 6, the trip pin being in releasing position.

Fig. 8 is a sectional view of said latching mechanism of Figs. 6 and 7, taken on the line 8—8 of Fig. 6.

Description

As shown in the drawings in the form illustrated, we employ the rotatable refrigerating drum A mounted on the tubular shaft B, the shaft B rotating upon the fixed shaft A. The drum A comprises the dished concave heads 9—9 and the peripheral wall 10. The fixed shaft C has the inlet bore 11 having a plurality of pipes 12 extending into the hollow interior of the drum A.

The pipes 12 are provided with the heads or nozzles 13, the bore 11 and pipes 12 serving to maintain a supply of a suitable refrigerant within the hollow interior of the drum A, the level of said refrigerant being determined by the open mouth of the outlet pipe 16, which extends into the hollow shaft C and communicates with the outlet bore 17.

We have provided the drum A with the insulating jacket 18 and the stationary chilling tank 19 interposed between the periphery of the drum 10 and the insulating jacket 18 (see Fig. 2), thus providing the annular channel 20 between the outer wall 10 of the drum A and the inner wall of the tank 19. The periphery of the drum A is provided with the series of compartments, pockets or units 21, each provided with a lid 22, said lids 22 being hinged, as indicated by 23, to a base-plate 24. Each of the base-plates 24 is mounted upon a pin 25, the pin 25 extending through brackets 26 and through the coiled spring 27; each of the pins 25 is screw-threaded at its inner end and provided with the nut 28 (see Fig. 5). In front of the charging end of our apparatus is a receiving table 29 to which the material to be refrigerated is brought by the conveyors 30—30, the product being delivered to the table 29 in suitable cut blocks to be accommodated by the units 21.

The uppermost compartment 21 having a block or parcel of the food product placed therein, the corresponding lid 22 advances with the rotation of the drum A to the point where it encounters the pressure-roller 31, by which said lid 22 is closed and its free end engaged in one of the serrated notches 32 on the plunger 33, which plunger 33 is kept in normally distended position by the coiled springs 34 (see Fig. 8), the pocket or unit 21 thus being charged with its content is rotated through the channel 20 until it reaches a point approximately at the level of the discharge table 35. When the trip-pin 36 encounters the tripping arm 37 (see Fig. 4) the lid 22 is opened by the withdrawal of the latch 33 and the refrigerated contents of the unit 21 drops upon the guide 38 and is discharged upon the table 35.

The purpose of the serrations 32 upon the head 33 is to accommodate various thicknesses of material carried in the units 21.

The hereinbefore described embodiment of our invention is particularly adapted for use with a liquid refrigerant, any suitable kind of which may be employed, such as, for instance, brine, but it is distinctly to be understood that the invention is not limited to the use of the refrigerating unit of the type hereinbefore described with any particular refrigerant. It is advantageous to employ the same kind of refrigerant in both the drum and the chilling tank, but it is apparent that the refrigerating unit will operate efficiently even though a different kind of refrigerant be employed in the drum from that which is employed in the chilling tank.

The degree of refrigeration to be maintained within the drum A is intended to be such as to administer the desired refrigeration to the contents of each of the units 21 during its progress from the mouth of the channel 20 to its exit at the other end (40), of said channel 20.

The tubular shaft B is provided with a fixed sprocket 41, which sprocket is driven by any suitable source of power (not shown) to revolve the drum A.

Various modifications of the structure thus illustrated and described may be effected without departure from our actual invention, as defined by the appended claims.

We claim—

1. In a device of the class described, a refrigerating drum, means for circulating a refrigerating medium within said drum; a compartment mounted on the periphery of said drum; a lid for said compartment arranged to compress the contents of said compartment; means for locking said lid in compressed position; and means for biasing said lid against the drum when locked in compressed position.

2. A refrigerating apparatus comprising a refrigerating drum; means for rotating said drum while maintaining a constantly moving supply of refrigerant within said drum, a refrigerating unit mounted on the periphery of said drum; a closure for said unit; means operative upon movement of the drum to deflect said closure and compress the contents of said unit; means for locking said closure during the refrigeration of its contents; means for unlocking said closure when the refrigeration of its contents is completed.

3. In a device of the class described, a refrigerating drum; means for rotating said drum; a series of refrigerating units mounted upon the periphery of said drum; a hinged lid mounted on each of said units; means for closing said lids under pressure during the rotation of said drum; means for locking said lids in compressed position; and means associated with said drum for successively unlocking said lids and releasing the contents of said units.

4. In a device of the class described, a refrigerating drum; means for rotating said drum; means for supplying the interior of said drum with refrigerant; means for continuously agitating said refrigerant within said drum; a series of refrigerating units mounted upon the periphery of said drum; a hinged lid mounted on each of said units; means for closing said lids under pressure during the rotation of said drum; means for locking said lids in compressed position; and means associated with said drum for successively unlocking said lids and releasing the contents of said units.

5. In a refrigerating apparatus, in combination with a refrigerated channel; a conveying unit arranged to travel through said channel, and having a compressible hinged lid; in combination with means located at the entrance to said channel to compress and lock said lid, and means located at the exit from said channel to unlock said lid and effect the discharge of the refrigerated contents of said unit.

6. A refrigerating apparatus comprising, means forming a channel having an isolated body of refrigerant contiguous therewith, means for transporting an article to be chilled through said channel in refrigerating relation to said body, means at the entrance to said channel for compressing the article, and means at the exit from said channel to release the article.

7. A refrigerating apparatus comprising, means forming a channel having an isolated body of refrigerant contiguous therewith, a conveyor movable in said channel for transporting an article to be chilled, and means on said conveyor for compressing the article at the entrance and releasing the article at the exit from the channel.

8. A refrigerating apparatus comprising, a movable member having an imperforate wall, a body of refrigerant on one side of said wall, clamping means on the other side of said wall disposed to receive an article to be chilled, and a second body of refrigerant adjacent said clamping means and on the opposite side thereof from the first mentioned body.

9. A refrigerating apparatus comprising, a drum having an imperforate peripheral wall forming a refrigerating surface of substantial area, a body of refrigerant on the interior of said drum, and a series of devices on the exterior of said wall disposed to maintain articles to be chilled in contact therewith.

10. A refrigerating apparatus for freezing food products comprising, a movable tank having a quantity of liquid refrigerant therewithin, a stationary tank having a quantity of liquid refrigerant therewithin, said stationary tank being spaced from and adjacent said movable tank to define a channel therebetween, means for retaining food product on said movable tank for movement through said channel, and means at the end of said channel to release the food product.

11. A refrigerating apparatus for freezing food products comprising, a movable tank having a quantity of liquid refrigerant therewithin, a stationary tank having a quantity of liquid refrigerant therewithin, said stationary tank being spaced from and adjacent said movable tank to define a channel therebetween, and means for retaining food products on said movable tank during movement thereof through said channel.

12. A refrigerating apparatus for freezing food products comprising, a rotatable drum for containing a quantity of liquid refrigerant, a stationary tank partially surrounding said drum, and spaced therefrom, said tank disposed to contain a quantity of liquid refrigerant, a plurality of compartments about the outer periphery of said drum, and means for compressing food products in said compartments during movement thereof in the region of said tank.

13. A refrigerating apparatus for freezing food products comprising, a rotatable drum for containing a quantity of liquid refrigerant, a stationary tank partially surrounding said drum, and spaced therefrom, said tank disposed to contain a quantity of liquid refrigerant, a plurality of compartments about the outer periphery of said drum, lids for said compartments, and resilient means on said lids for engagement with said tank during movement thereof to maintain said lids in closed position.

14. A refrigerating apparatus comprising a rotatable refrigerating drum; a series of compartments arranged around the periphery of said drum; a lid for each of said compartments arranged to compress the contents of said compartments, and resilient means for biasing said lids into compressing position.

15. A refrigerating apparatus comprising, a series of heat conducting walls arranged for rotation about an axis, means for pressing products to be frozen against one side of said walls, a refrigerant conduit extending along said axis, and tubes extending radially from said conduit for delivering refrigerant adjacent the walls but on the opposite side thereof, from the product to be frozen.

16. A refrigerating apparatus comprising, a series of heat conducting walls arranged for rotation about an axis, means for pressing products to be frozen against one side of said walls, means for moving said pressing means into active position during rotation of the apparatus, a refrigerant conduit extending along said axis, and tubes extending radially from said conduit for delivering refrigerant adjacent the walls but on the opposite side thereof from the product to be frozen.

17. A refrigerating apparatus comprising, a series of refrigerating compartments mounted for rotation about an axis, said compartments having an imperforate refrigerated wall and a cooperating member for holding a product in heat transferring relation with said wall, said cooperating member being resiliently mounted for bodily movement toward and away from said refrigerated wall, and means for supplying fresh refrigerant to the side of said wall opposite the product while the apparatus is rotating.

18. An apparatus for freezing comestibles, comprising, a movable tank having a quantity of fluid refrigerant therewithin, a stationary chilling tank, said stationary tank being spaced from and adjacent said movable tank to define a channel therebetween, means for retaining comestibles on said movable tank for movement through said channel, and means at the end of said channel to release the comestibles.

19. An apparatus for freezing comestibles, comprising, a movable tank having a quantity of fluid refrigerant therewithin, a stationary chilling tank, said stationary tank being spaced from and adjacent said movable tank to define a channel therebetween, and means for retaining comestibles on said movable tank during movement thereof through said channel.

20. An apparatus for freezing comestibles, comprising, a rotatable drum for containing a quantity of fluid refrigerant, a stationary chilling tank partially surrounding said drum, and spaced therefrom, a plurality of compartments about the outer periphery of said drum, and means for compressing comestibles in said compartments during movement thereof in the region of said tank.

ALBERT V. RUDD.
CHARLES L. ASHLEY.